(12) United States Patent
Chen

(10) Patent No.: US 9,545,766 B2
(45) Date of Patent: Jan. 17, 2017

(54) METHOD FOR MANUFACTURING LIGHT-GUIDE DEVICE

(71) Applicant: National Kaohsiung University of Applied Sciences, Kaohsiung (TW)

(72) Inventor: Chin-Tai Chen, Kaohsiung (TW)

(73) Assignee: NATIONAL KAOHSIUNG UNIVERSITY OF APPLIED SCIENCES, Kaohsiung (TW)

(*) Notice: Subject to any disclaimer, the term of this patent is extended or adjusted under 35 U.S.C. 154(b) by 511 days.

(21) Appl. No.: 13/950,839

(22) Filed: Jul. 25, 2013

(65) Prior Publication Data
US 2014/0306362 A1    Oct. 16, 2014

(30) Foreign Application Priority Data

Apr. 10, 2013    (TW) .............................. 102112662 A

(51) Int. Cl.
| | |
|---|---|
| B29D 11/00 | (2006.01) |
| G02B 6/02 | (2006.01) |
| G02B 6/122 | (2006.01) |
| G02B 6/138 | (2006.01) |

(52) U.S. Cl.
CPC ..... *B29D 11/00682* (2013.01); *G02B 6/02038* (2013.01); *G02B 6/1221* (2013.01); *G02B 6/138* (2013.01)

(58) Field of Classification Search
CPC ..................... B29D 11/00682; G02B 6/02038; G02B 6/1221; G02B 6/138
See application file for complete search history.

(56) References Cited

U.S. PATENT DOCUMENTS

2009/0202713 A1* 8/2009 Pitwon ................. G02B 6/1221
427/163.2

FOREIGN PATENT DOCUMENTS

JP    4-77705    * 3/1992

* cited by examiner

*Primary Examiner* — Mathieu Vargot
(74) *Attorney, Agent, or Firm* — Muncy, Geissler, Olds & Lowe, P.C.

(57) ABSTRACT

A method for manufacturing a light-guide device includes: obtaining a substrate having a flow passage; providing inkjet printing equipment having a liquid jetting head apparatus; and injecting an optical wave guide micro-droplet into the flow passage by using the liquid jetting head apparatus of the inkjet printing equipment, to form a light-guide device in the flow passage.

10 Claims, 11 Drawing Sheets

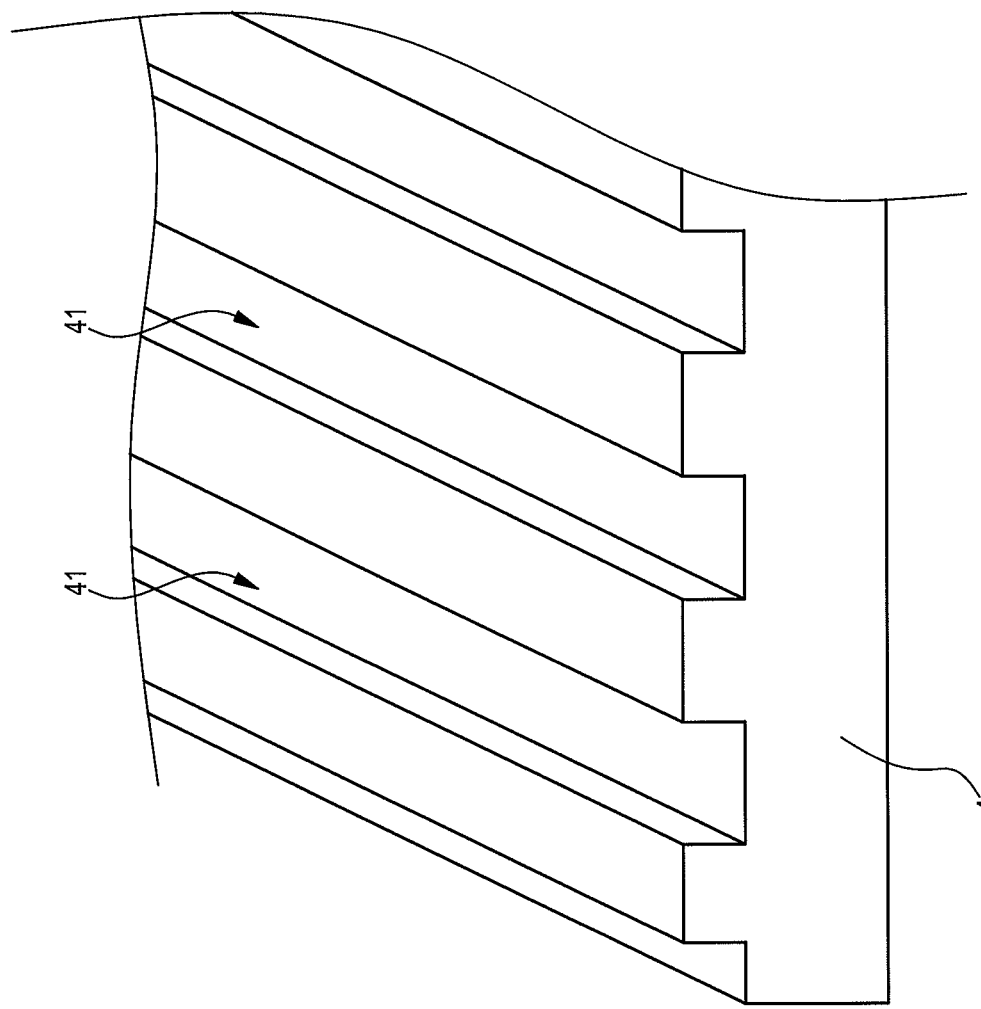

METHOD FOR MANUFACTURING LIGHT-GUIDE DEVICE

CROSS-REFERENCE TO RELATED APPLICATION

This application claims the benefit of Taiwan Patent Application No. 102112662, filed on Apr. 10, 2013, which is hereby incorporated by reference for all purposes as if fully set forth herein.

BACKGROUND OF THE INVENTION

Field of Invention

The present invention relates to a method for manufacturing an optical device, and particularly to a method for manufacturing a micro light-guide device.

Related Art

In order to achieve the purpose of the light weight and thin volume, current electronic products are miniaturized, so that consumers not only have multiple functions of the electronic products but also conveniently carry the electronic product. Therefore, in order to achieve the purpose of miniaturization of the electronic products, currently, different methods (for example, micro molding and photolithography) begin to be used to manufacture a light-guide device in the industry. It can be known from this that, the manner for manufacturing the light-guide device becomes a subject that relevant industries such as LED illumination, semiconductors, displays, or biological chip detection are concerned with.

SUMMARY OF THE INVENTION

In view of this, the present invention provides a method for manufacturing a light-guide device, where an optical device is manufactured by using an inkjet printing technology.

According to the foregoing objective, the present invention provides a method for manufacturing a light-guide device, which including: obtaining a substrate having a flow passage; providing inkjet printing equipment having a liquid jetting head apparatus; and injecting an optical wave guide micro-droplet into the flow passage by using the liquid jetting head apparatus of the inkjet printing equipment, to form a light-guide device in the flow passage.

In the method for manufacturing a light-guide device according to an embodiment of the present invention, a light wave refractive index of the light-guide device is greater than a light wave refractive index of a wall body of the flow passage.

In the method for manufacturing a light-guide device according to an embodiment of the present invention, the flow passage includes a linear flow passage or a curved flow passage.

In the method for manufacturing a light-guide device according to an embodiment of the present invention, the substrate is a glass substrate or a plastic substrate.

In the method for manufacturing a light-guide device according to an embodiment of the present invention, the substrate is obtained through the following steps: providing a plate body; performing a cleaning progress on the plate body; coating photo-resist on the surface of the plate body; performing an exposure process on the photo-resist by using a mask, to form a flow passage pattern in the photo-resist; pouring a substrate material on the surface of the plate body and the flow passage pattern; curing the substrate material so that the substrate material becomes the substrate; and separating the substrate from the plate body.

In the method for manufacturing a light-guide device according to an embodiment of the present invention, a material of the substrate comprises polydimethylsiloxane (PDMS).

In the method for manufacturing a light-guide device according to an embodiment of the present invention, a material of the optical wave guide micro-droplet comprises ethylene glycol.

In the method for manufacturing a light-guide device according to an embodiment of the present invention, a material of the optical wave guide micro-droplet comprises a UV-curable photopolymer, and the method for manufacturing a light-guide device further includes: after forming the light-guide device in the flow passage, taking the light-guide device out of the flow passage.

The efficacy of applying the present invention is that, an optical wave guide micro-droplet is injected into a flow passage of a substrate by using an inkjet printing technology, to directly form a light-guide device, so that the process for manufacturing the light-guide device is more rapid and more efficient. Moreover, due to the inkjet printing technology, different materials may be selected for optical wave guide micro-droplets according to requirements of manufacturers, thereby facilitating manufacturing of light-guide devices or other optical devices having different material characteristics.

BRIEF DESCRIPTION OF THE DRAWINGS

The present invention will become more fully understood from the detailed description given herein below for illustration only, and thus are not limitative of the present invention, and wherein:

FIG. 6 is a schematic view of a substrate applied in a method for manufacturing a light-guide device according to another embodiment of the present invention;

DETAILED DESCRIPTION OF THE INVENTION

In order to make the forgoing objectives, features, and characteristics of the present invention more clear and easier to understand, relevant embodiments of the present invention are described in detail below with reference to accompanying drawings.

Figure 1A:
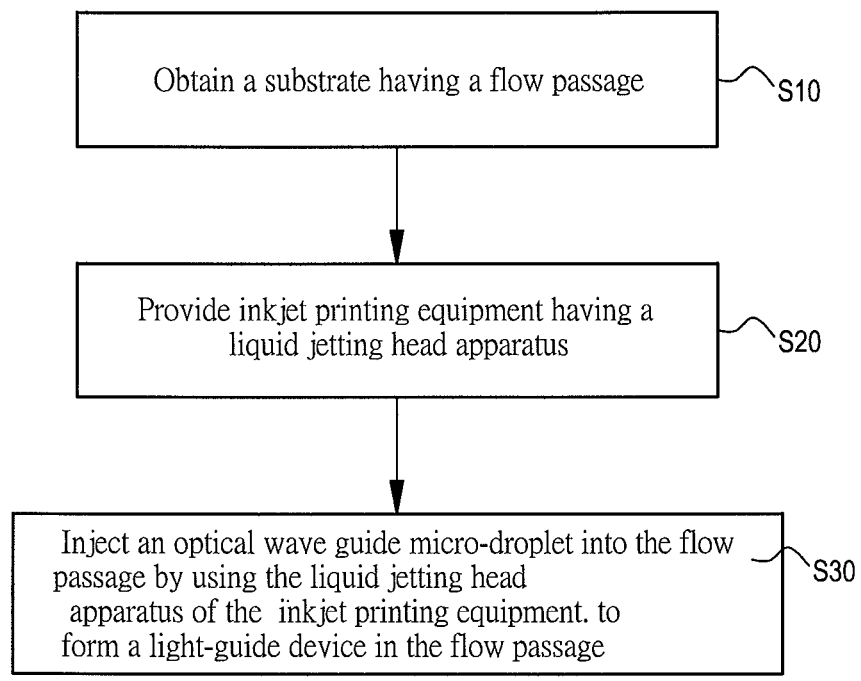
FIG. 1A is a flow chart of a method for manufacturing a light-guide device according to an embodiment of the present invention.
Figure 1B:
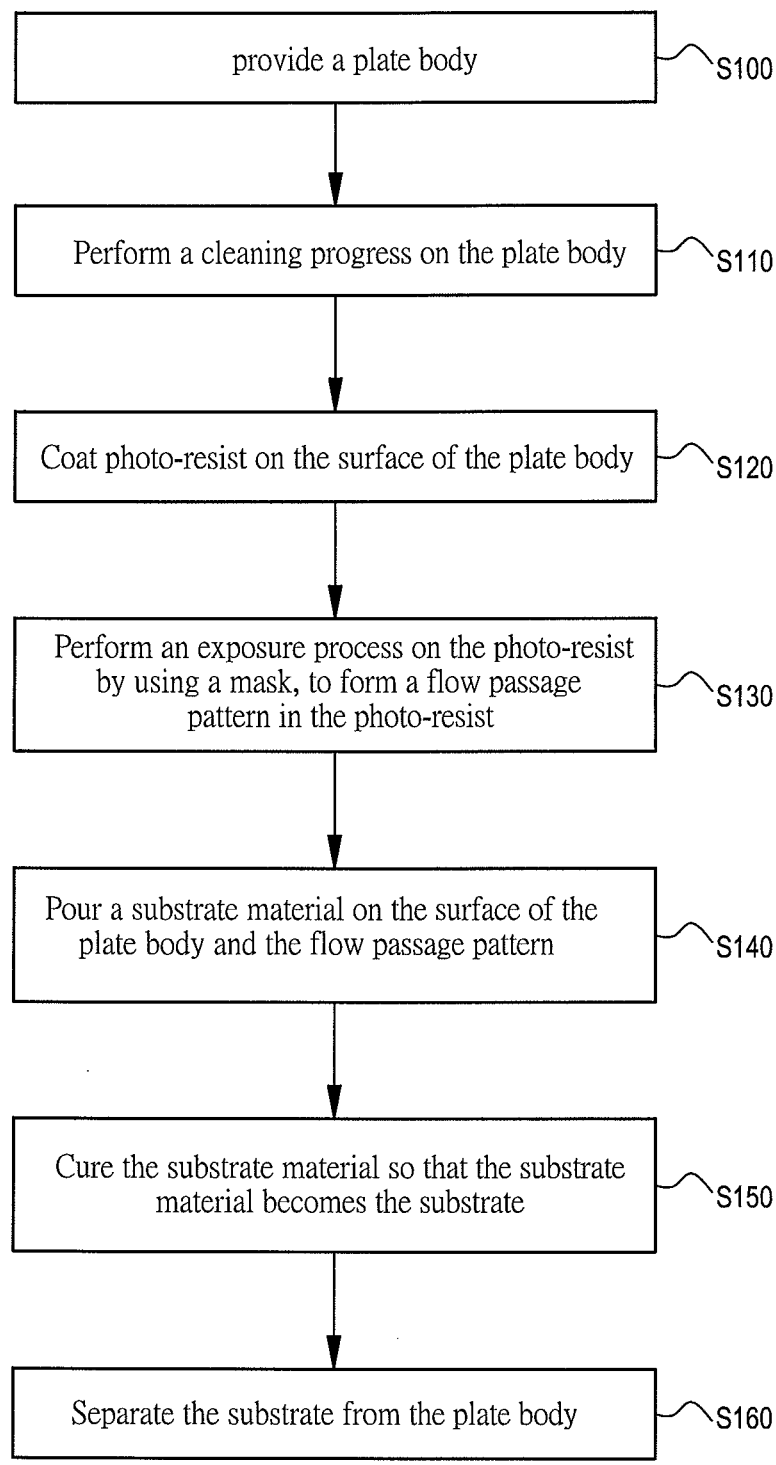
FIG. 1B is a flow chart of manufacturing a substrate applied in a method for manufacturing a light-guide device according to an embodiment of the present invention.
Figure 2A:
FIG. 2A to FIG. 2E are schematic views of a manufacturing process of a substrate applied in a method for manufacturing a light-guide device according to an embodiment of the present invention.
Figure 2B:
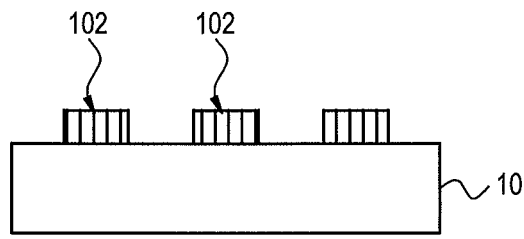
Figure 2C:
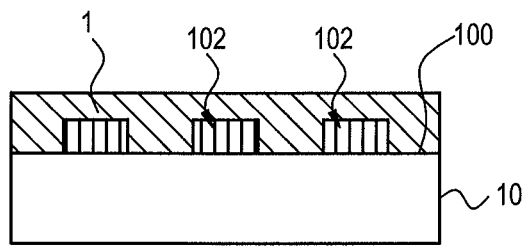
Figure 2D:
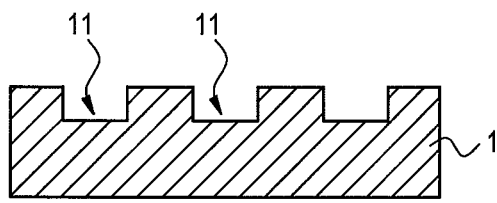
Figure 2E:
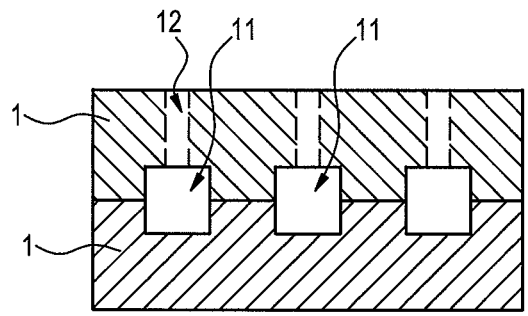
Figure 3A:
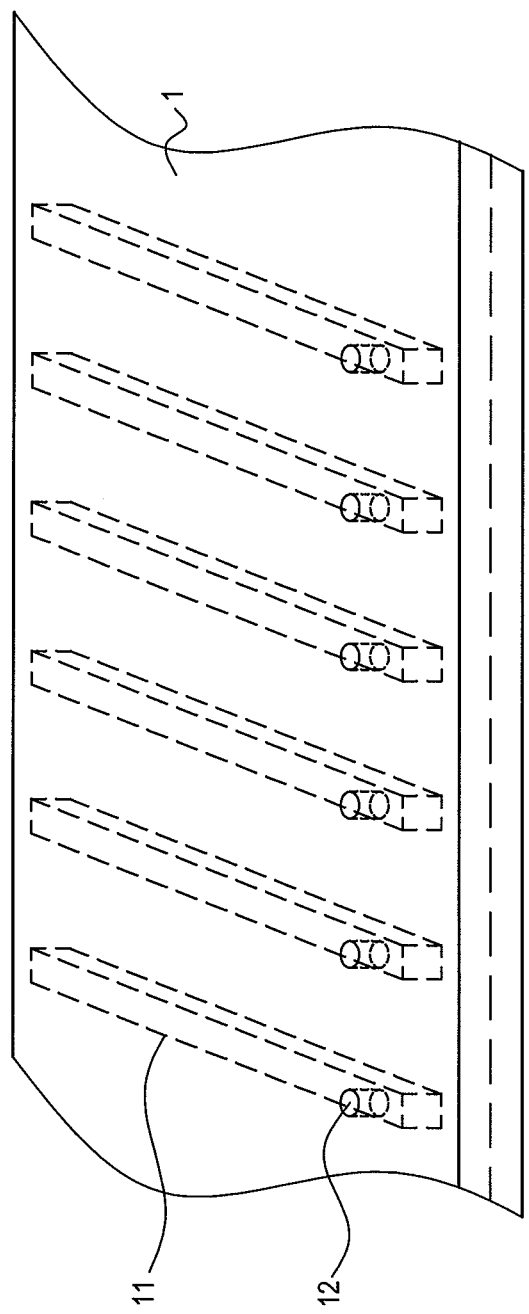
FIG. 3A is a schematic view of a substrate applied in a method for manufacturing a light-guide device according to an embodiment of the present invention.

Referring to FIG. 1A to FIG. 3A, FIG. 1A is a flow chart of a method for manufacturing a light-guide device according to an embodiment of the present invention; FIG. 1B is a flow chart of manufacturing a substrate applied in a method for manufacturing a light-guide device according to an embodiment of the present invention; FIG. 2A to FIG. 2E are schematic views of a manufacturing process of a substrate applied in a method for manufacturing a light-guide device according to an embodiment of the present invention; FIG. 3A is a schematic view of a substrate applied in a method for manufacturing a light-guide device according to an embodiment of the present invention.

As shown in FIG. 1A, the method for manufacturing a light-guide device includes the following steps: obtaining a substrate having a flow passage (Step S10); providing inkjet printing equipment having a liquid jetting head apparatus (Step S20); and injecting an optical wave guide micro-droplet into the flow passage by using the liquid jetting head apparatus of the inkjet printing equipment, to form a light-guide device in the flow passage (Step S30).

In Step S10, a manufacturer may prepare a substrate 1. The substrate 1 has a pre-designed flow passage 11 (for this part, reference may be made to FIG. 2D, FIG. 2E, and FIG. 3A).

At the same time, reference is made to FIG. 1B and FIG. 2A to FIG. 2E. The substrate 1 may be obtained through the following steps: providing a plate body (Step S100); performing a cleaning progress on the plate body (Step S110); coating photo-resist on the surface of the plate body (Step S120); performing an exposure process on the photo-resist by using a mask, to form a flow passage pattern in the photo-resist (Step S130); pouring a substrate material on the surface of the plate body and the flow passage pattern (Step S140); curing the substrate material so that the substrate material becomes the substrate (Step S150); and separating the substrate from the plate body (Step S160).

In Step S100, a silicon wafer is used as the plate body 10, but the present invention is not limited thereto (the plate body 10 may also be glass or other materials). In Step S110, the cleaning progress may be performed on the plate body 10 by using acetone, Isopropyl alcohol (IPA), and deionized water, so as to clean dirt from the surface of the plate body 10.

In Step S120, negative photo-resist (for example, SU-8 negative photo-resist, MicroChem, USA (but the present invention is not limited thereto)) may be spin-coated on the surface of the plate body 10, and then baked to remove a solvent, forming a cured film layer with a micron-scale thickness (for example, a thickness of 100 microns). In Step S130, the exposure process may be performed on the photo-resist by using the mask, so as to form the flow passage pattern 102 in the photo-resist (as shown in FIG. 2B). For example, the photo-resist may be exposed and developed through conventional photolithography, so as to form a flow passage pattern 102 with a micron-scale width (for example, a flow passage pattern 102 with a width of 200 microns).

The flow passage pattern 102 is a pre-formed structure of the flow passage 11 of the substrate 1. It is worth mentioning that, the flow passage pattern 102 is of a strip shape, so as to be used as a light wave conduction path. Strip flow passage patterns 102 of different shapes may be designed on the plate body 10 according to requirements of the manufacturers. For example, the flow passage pattern 102 may include a linear or curved flow passage pattern, and the section of the flow passage pattern 102 may be a triangle, square, polygon, hemicycle, cycle, or other shapes, but the present invention is not limited thereto.

In Step S140, a PDMS (the present invention is not limited to PDMS) substrate material may be poured on the surface 100 of the plate body 10 and the flow passage pattern 102. In Step S150, the PDMS substrate material may be cured through vacuum degassing and high-temperature baking, forming the substrate 1 having the corresponding flow passage pattern 102. It can be known from this that, a material of the substrate 1 is PDMS, so that the substrate 1 is a plastic substrate. Definitely, the material of the substrate 1 may also be glass, so that the substrate 1 is a glass substrate, but the present invention is not limited to the disclosure of this embodiment. In Step S160, the substrate 1 may be separated from the plate body 10 through a rollover operation (as shown in FIG. 2C and FIG. 2D), and due to the flow passage pattern 102, the substrate 1 has the flow passage 11 corresponding to the flow passage pattern 102.

In this embodiment, Step S100 to Step S160 may be repeated to manufacture another substrate 1. In this way, two corresponding substrates 1 may be combined to form a combined structure of substrates (as shown in FIG. 2E). Moreover, one of the substrates 1 further has an open pore 12 communicating with the flow passage 11, for the subsequent manufacturing processes of the method for manufacturing a light-guide device to use.

Figure 3B:
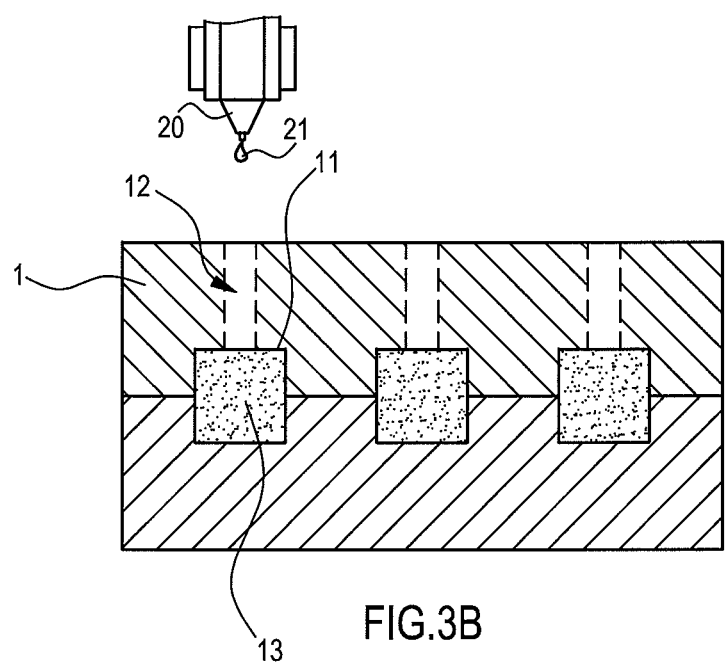
FIG. 3B is a schematic view of manufacturing a light-guide device by using an inkjet printing technology in a method for manufacturing a light-guide device according to an embodiment of the present invention.

Referring to FIG. 1A, FIG. 3A, and FIG. 3B, FIG. 3B is a schematic view of manufacturing a light-guide device by using an inkjet printing technology in a method for manufacturing a light-guide device according to an embodiment of the present invention.

To continue the above, after the substrate 1 having the flow passage 11 is obtained, in Step S20 and Step S30, the manufacturer may manufacture a light-guide device (for example, a micro light-guide device) 13 by using the inkjet printing technology. Specifically, the manufacturer may manufacture the light-guide device by using the inkjet printing equipment having the liquid jetting head apparatus 20. The liquid jetting head apparatus 20 (for example, Dimatix DMP-2800 Printhead, FujiFilm, USA) is pre-filled with a material of an optical wave guide micro-droplet 21. In this embodiment, the material of the optical wave guide micro-droplet 21 may be ethylene glycol.

Therefore, the optical wave guide micro-droplet 21 can be injected into each flow passage 11 of the substrate 1 by using the liquid jetting head apparatus 20 of the inkjet printing equipment, so that the light-guide device 13 is formed in each flow passage 11 and the light-guide device 13 has a shape corresponding to a shape of the flow passage 11. In this way, the light-guide device 13 is completely manufactured. It can be known from this that, a plurality of light-guide devices 13 may be manufactured on the substrate 1 at the same time by using the inkjet printing technology, thereby improving the manufacturing efficiency of the light-guide device 13.

Preferably, the manufacturer may inject the optical wave guide micro-droplet 21 from the open pore 12 of the substrate 1. It can be known from this that, the flow passages 11 in this embodiment are located inside the combined structure of the substrates 1 to form a closed pipe.

Figure 3C:
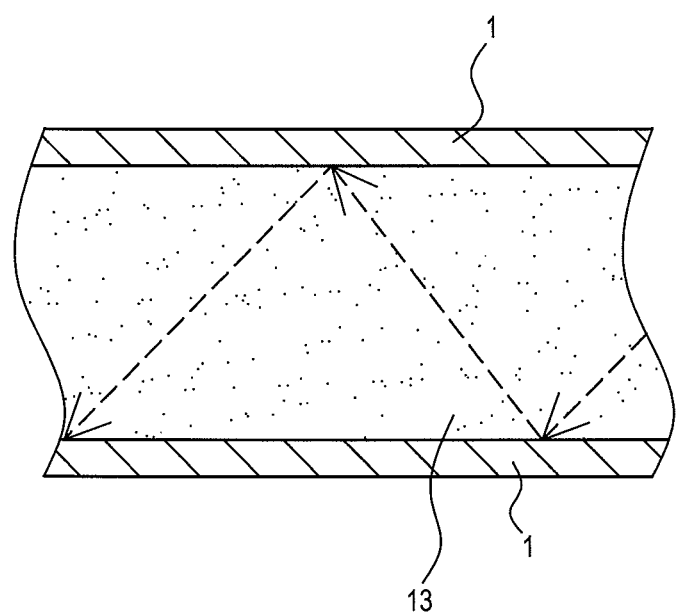
FIG. 3C is a schematic partial side view of the light-guide device and a substrate in FIG. 3B.

Referring to FIG. 3C, FIG. 3C is a schematic partial side view of the light-guide device and the substrate in FIG. 3B.

To continue the above, the material of the light-guide device 13 is ethylene glycol (used as a core layer); the material of the substrate 1 is PDMS (used as a shell layer). According to the characteristics of the material, a light wave refractive index of the light-guide device 13 is greater than a light wave refractive index of a wall body (that is, the substrate 1) of the flow passage 11, so when a light wave (as shown by dotted arrows in FIG. 3C) travels the strip light-guide device 13, total internal reflection occurs at an interface between the strip light-guide device 13 and the wall body (the substrate 1) of the flow passage 11, thereby achieving the purpose of transferring the light wave (light ray).

Here, it should be noted that, the light wave refractive index (n1) of the light-guide device 13 must be greater than the light wave refractive index (n2) of the wall body (the substrate 1) of the flow passage 11. According to the Snell equation, a critical angle θc for total internal reflection (TIR) of an incident light wave satisfies $n1 \times \sin\theta c = n2 \times \sin(90°)$. In other words, if an incident angle of a light wave is greater than the critical angle $\theta c = \sin^{-1}(n2/n1)$, total internal reflection of the light wave occurs continually at the interface between the strip light-guide device 13 and the wall body (the substrate 1) of the flow passage 11, so that the light wave is effectively carried and transferred.

For example, the material of the light-guide device 13 of this embodiment is ethylene glycol, used as a liquid core, where a visible light ($\lambda$=400-700 nm) refractive index n1 of the light-guide device 13 is equal to 1.432; the material of the wall body (the substrate 1) of the flow passage 11 is PDMS, used as a solid shell, where a visible light ($\lambda$=400-700 nm) refractive index n2 of the wall body (the substrate 1) is equal to 1.406. In this way, when a red light wave ($\lambda$=632 nm) is used, a critical angle for total internal reflection is calculated as $\theta c = \sin^{-1}(1.406/1.432) = 79.06°$. In other words, if an incident angle the red light wave is greater than 79.1° (and less than 90°), total internal reflection of the red light wave occurs continually at the interface between the strip light-guide device 13 and the wall body (the substrate 1) of the flow passage 11, and the red light wave continuously advances along the strip flow passage 11.

Figure 4:
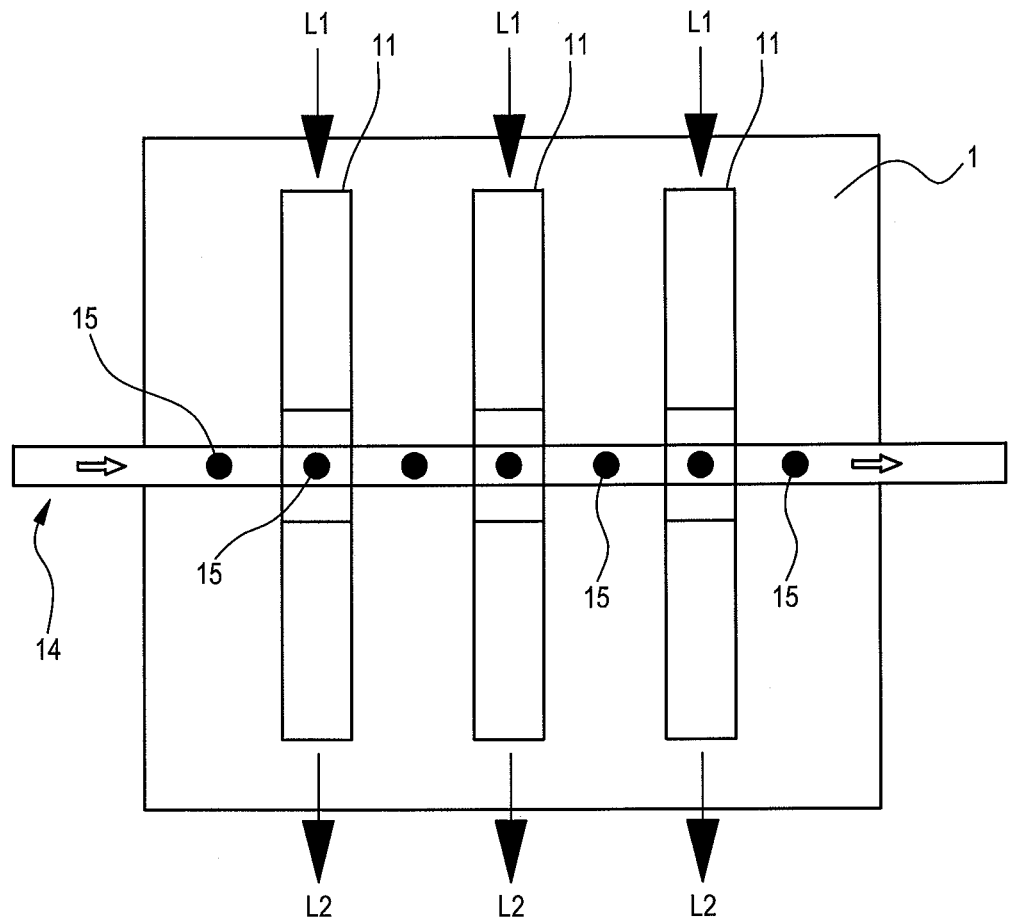
FIG. 4 is a schematic view of application of a light-guide device and a substrate according to an embodiment of the present invention.

Referring to FIG. 4, FIG. 4 is a schematic view of application of a light-guide device and a substrate according to an embodiment of the present invention.

During actual application, a specimen flowing pipe 14 is disposed on the substrate 1. The specimen flowing pipe 14 communicates with each flow passage 11 of substrate 1 and is used for a relevant specimen 15 to be tested to pass through. A combination of the substrate 1, the flow passage 11 and the specimen flowing pipe 14 may be used as a microfluid chip. Different light waves L1 may be pre-projected into the flow passages 11, so that relevant characteristics of the specimen 15 (for example, urine or blood) to be tested passing through the specimen flowing pipe 14 can be known in an order of the flow passages 11 having light waves projected. In this way, the substrate 1 can be used for medical science.

For example, a light wave L1 (for example, red light, green light, or blue light, which are not limited) is projected at one end of the flow passage 11, and the light wave is received at the other end of the flow passage 11, to capture strength of a light wave signal L2 as a specimen signal of the specimen 15 to be tested. In this way, the relevant characteristics (for example, urine concentration, the number of blood cells, the number of particles, a cell shape, or the like) of the specimen 15 to be tested can be known in each closed flow passage 11.

Figure 5:
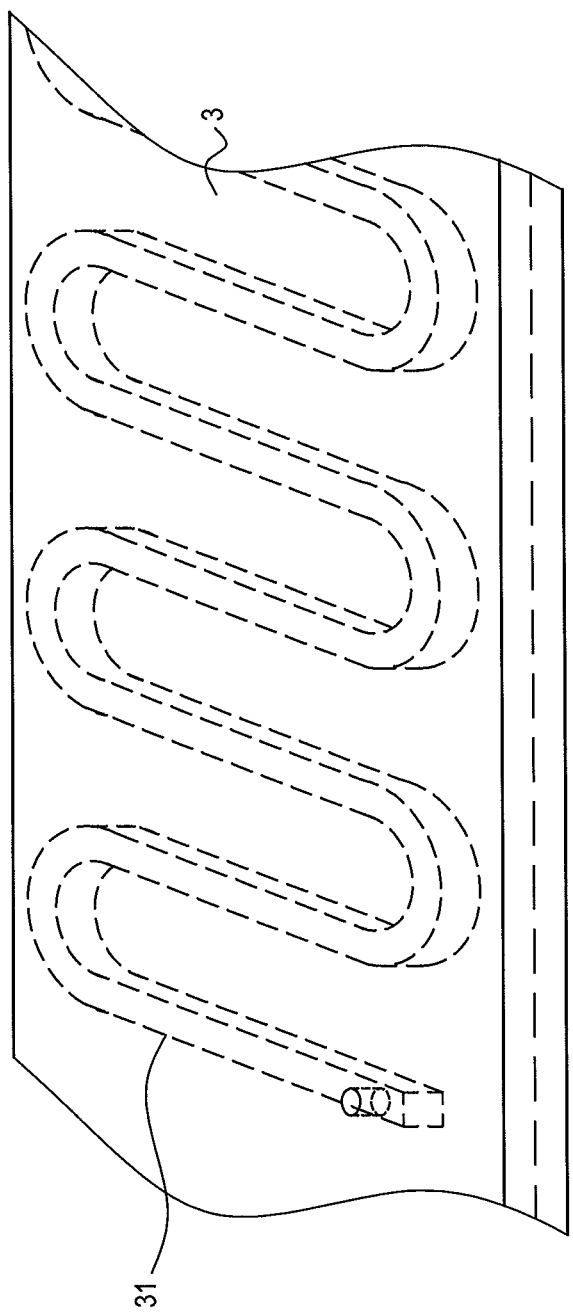
FIG. 5 is a schematic view of a substrate applied in a method for manufacturing a light-guide device according to another embodiment of the present invention.

Referring to FIG. 5, FIG. 5 is a schematic view of a substrate applied in a method for manufacturing a light-guide device according to another embodiment of the present invention.

As shown in FIG. 5, besides the foregoing linear flow passage, a flow passage 31 of a substrate 3 may also be designed to be a curved flow passage. It can be known from FIG. 3 that, the flow passage 31 may have linear and curved shapes.

Referring to FIG. 6 and FIG. 7A to FIG. 7D, FIG. 6 is a schematic view of a substrate applied in a method for manufacturing a light-guide device according to another embodiment of the present invention; FIG. 7A to FIG. 7D are schematic views of a manufacturing process of the substrate in FIG. 6.

Figure 7A:
FIG. 7A to FIG. 7D are schematic views of a manufacturing process of the substrate in FIG. 6.
Figure 7B:
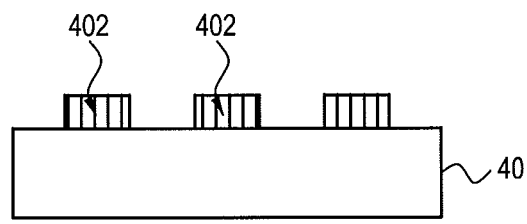
Figure 7C:
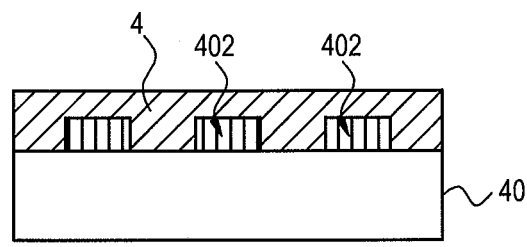
Figure 7D:
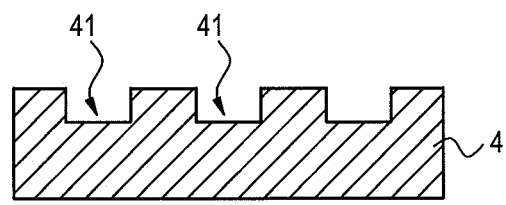

The difference from the foregoing embodiment is that, a flow passage 41 is of an open type and is located at the surface of a substrate 4. A manufacturer may also manufacture the substrate 4 by using Steps S100 to S160. For brevity, Steps S100 to S160 are not described again here. However, in Steps S100 to S160 for manufacturing the substrate 4, a plate body 40 may have a glass material (as shown in FIG. 7A); photo-resist may be positive photo-resist (for example, S1818 positive photo-resist, Clariant, USA (but the present invention is not limited thereto)) (as shown by a flow passage pattern 402 in FIG. 7B).

Figure 7E:
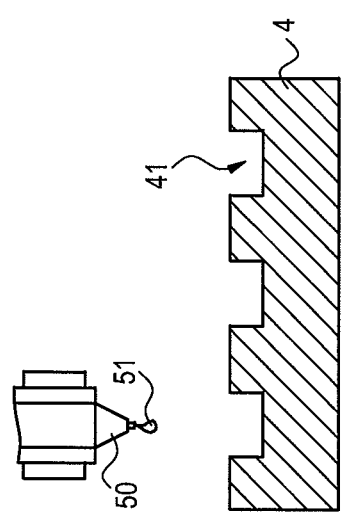
FIG. 7E to FIG. 7G are schematic views for injecting an optical wave guide micro-droplet into a flow passage of the substrate in FIG. 6 by using inkjet printing equipment to form a light-guide device.
Figure 7F:
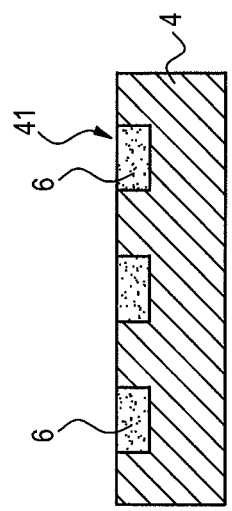
Figure 7G:
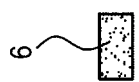
Figure 8:
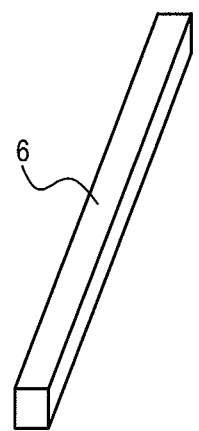
FIG. 8 is a three-dimensional view of the light-guide device in FIG. 7G.

Referring to FIG. 7E to FIG. 7G, FIG. 7E to FIG. 7G are schematic views for injecting an optical wave guide micro-droplet into the flow passage of the substrate in FIG. 6 by using inkjet printing equipment to form a light-guide device; FIG. 8 is a three-dimensional view of the light-guide device in FIG. 7G.

After Steps S100 to S160 are completed, the substrate 4 can be obtained. Similarly, through Step S20 and Step S30, the manufacturer may manufacture the light-guide device by using the inkjet printing equipment having a liquid jetting head apparatus 50. The liquid jetting head apparatus 50 is pre-filled with a material of an optical wave guide micro-droplet 51. In this embodiment, the material of the optical wave guide micro-droplet 51 may be a UV-curable photo-polymer, and the optical wave guide micro-droplet 51 is injected into the flow passage 41 by using the liquid jetting head apparatus 50. The method for manufacturing a light-guide device further includes: after forming the light-guide device 6 in the flow passage 41, taking the light-guide device 6 out of the flow passage 41. In other words, a material of the light-guide device 6 is a UV-curable photopolymer.

It can be known from this that, in this embodiment, the material of the light-guide device 6 is the UV-curable photopolymer (used as a core layer); air is used as a shell layer (as shown in FIG. 7G). According to the characteristic, a light wave refractive index of the light-guide device 6 is greater than that of air, so the strip light-guide device 6 may also achieve the purpose of transferring a light wave (light ray).

Here, it should be noted that, the light wave refractive index (n3) of the light-guide device 6 is greater than the light wave refractive index (n4) of air. That is to say, a visible light (λ=400-700 nm) refractive index n3 of the light-guide device 6 is equal to 1.51; a visible light (λ=400-700 nm) refractive index n4 of air is equal to 1. According to the characteristic, when a light wave (for example, green light (λ=550 nm)) is projected into the light-guide device 6, a critical angle for total internal reflection is calculated as $\theta c=\sin^{-1} (1/1.51)=41.47°$. In other words, if an incident angle of the green light wave is greater than 41.5° (and less than 90°), total internal reflection of the green light wave occurs continually at an interface between the light-guide device 6 and air, and the green light wave continuously advances along the strip flight-guide device 6.

Figure 9:
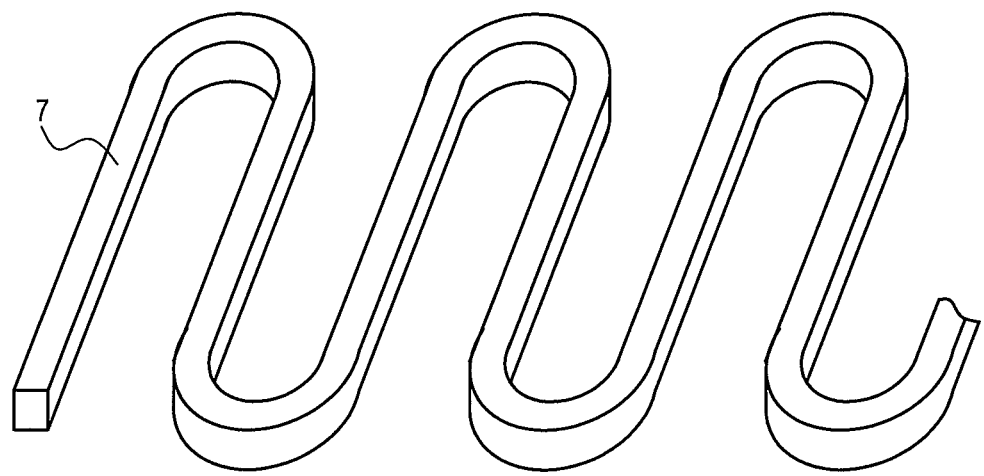
FIG. 9 is a three-dimensional view of a light-guide device according to another embodiment of the present invention.

Referring to FIG. 9, FIG. 9 is a three-dimensional view of a light-guide device according to another embodiment of the present invention.

As described above, a flow passage of a substrate can be designed to have different strips according to requirements, so a light-guide device formed in the flow passage has a shape corresponding to the flow passage. For example, when the flow passage is of a strip shape, the light-guide device 6 is of a strip shape (as shown in FIG. 8); in this embodiment, when the flow passage is of a curved shape, the light-guide device 7 is of a curved shape (as shown in FIG. 9). In this way, various light-guide devices or other optical devices are manufactured.

It can be known from this that, a plurality of light-guide devices (having the same shape or different shapes) may be formed in a substrate by using an inkjet printing technology, so that the process for manufacturing the light-guide device is more rapid and more efficient. Moreover, due to the inkjet printing technology, different materials may be selected for optical wave guide micro-droplets according to requirements of manufacturers, thereby facilitating manufacturing of light-guide devices or other optical devices having different material characteristics.

In sum, the present invention is only recorded to present preferred implementation manners or embodiments of technical means adopted to solve the problem, but not to limit the implementation scope of the present invention. All equivalent variations and modifications conforming to the literary content of the claims of the present invention and made according to the claims of the present invention are covered by the claims of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a light-guide device, comprising:
   obtaining a substrate having a plurality of flow passages;
   providing an inkjet printing equipment having a liquid jetting head apparatus; and
   injecting an optical wave guide micro-droplet through a plurality of open pores into the plurality of flow passages by using the liquid jetting head apparatus, to form a light-guide device in the plurality of flow passages,
   wherein a light wave refractive index of the light-guide device is greater than a light wave refractive index of a wall body of the plurality of flow passages,
   wherein the flow passages of the light-guide device are a constant width,
   wherein the light wave refractive index of the light-guide device is n1, the light wave refractive index of the wall body of the plurality of flow passages is n2, an incident angle of a light wave is greater than the critical angle $\theta c=\sin^{-1}(n2/n1)$,
   wherein each of the flow passages form a closed pipe, each the open pores respectively communicating with each of the flow passages.

2. The method for manufacturing a light-guide device according to claim 1, wherein the plurality of flow passages comprises a linear flow passage or a curved flow passage.

3. The method for manufacturing a light-guide device according to claim 1, wherein the substrate is a glass substrate or a plastic substrate.

4. The method for manufacturing a light-guide device according to claim 1, wherein the substrate is obtained through the following steps:
   providing a plate body;
   performing a cleaning progress on the plate body;
   coating photo-resist on the surface of the plate body;
   performing an exposure process on the photo-resist by using a mask, to form a flow passage pattern in the photo-resist, wherein the flow passage pattern of the light-guide device has the constant width;
   pouring a substrate material on the surface of the plate body and the flow passage pattern;
   curing the substrate material so that the substrate material becomes the substrate; and
   separating the substrate from the plate body.

5. The method for manufacturing a light-guide device according to claim 1, wherein a material of the substrate comprises polydimethylsiloxane (PDMS).

6. The method for manufacturing a light-guide device according to claim 1, wherein a material of the optical wave guide micro-droplet comprises ethylene glycol.

7. The method for manufacturing a light-guide device according to claim 1, wherein a material of the optical wave guide micro-droplet comprises a UV-curable photopolymer, and the method for manufacturing a light-guide device further comprises:
   after forming the light-guide device in each of the flow passages, taking the light-guide device out of the plurality of flow passages.

8. The method of claim 1, wherein the closed pipe of each flow passage has the constant width.

9. The method of claim 1, wherein the flow passages are S-shaped channels embedded in the substrate.

10. The method of claim 4, wherein the flow passage pattern is an S-shaped channel embedded in the substrate.

* * * * *